Nov. 17, 1936.  W. DÄLLENBACH  2,061,507
ELECTRIC DISCHARGE APPARATUS
Filed Nov. 9, 1934
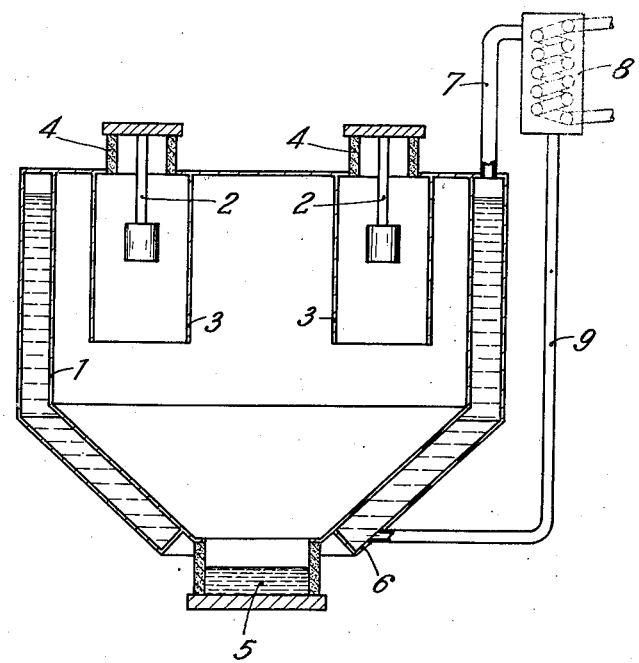
W. Dällenbach
INVENTOR
By: Glascock Downing & Seebold
ATTYS.

UNITED STATES PATENT OFFICE 2,061,507

ELECTRIC DISCHARGE APPARATUS

Walter Dällenbach, Berlin-Charlottenburg, Germany

Application November 9, 1934, Serial No. 752,346
In Germany November 11, 1933

15 Claims. (Cl. 250—27.5)

My invention relates to electric vacuum discharge apparatus, and to the method of operating same.

More particularly, it relates to electric vacuum discharge apparatus of the type including a metallic hermetically sealed vacuum vessel, and a cooling vessel, e. g., mercury vapour rectifiers.

It is an object of my invention to so design an apparatus of the type specified, and to so perform the method of operating it, that the diffusion of H ions or H atoms from the cooling liquid is eliminated. This elimination of the diffusion removes the deterioration of the vacuum and obviates the necessity of restoring it by pumping means, so that the apparatus is operated continuously without using pumping means.

To this end, I used a liquid halogen compound as the cooling medium circulating in the cooling vessel.

In apparatus of the type specified, and having mercury cathodes or incandescent cathodes, investigation of the gases which are released during the operation of such apparatus have yielded the result that in vessels which are completely vacuum-tight and which have been degassed at high temperatures large quantities of hydrogen are released in the vacuum. It was found that this hydrogen is derived from the cooling water. This occurs as follows:

With increase in temperature, the quantity of free hydrogen ions present in the cooling water increases. To a certain extent the water is dissociated into H— and OH— ions. The H— ions or H— atoms have the property of diffusing through iron, steel and most of the ordinary iron alloys used in technology and to pass through the walls of the water jacket into the vacuum chamber as hydrogen gas. This gradual deterioration of the vacuum due to the penetration of the hydrogen has hitherto made it impossible to operate continuously vacuum discharge apparatus with a metallic vacuum vessel without employing a pump to restore the vacuum and in addition it results in striking back. This striking back occurs more frequently the higher the temperature of the vessel and the longer the apparatus is operated without interruption. Duration of operation and increasing temperature operate in the same way and result in an increase of hydrogen within the walls of the apparatus. An appreciable deterioration of the vacuum is not of necessity associated therewith because the hydrogen passing into the vacuum is ionized by the discharge and is driven back to or into the walls. However, this participation in the discharge has the result that not only the parts directly cooled by the water but also all parts bounding the vacuum chamber, and the electrodes for example, are charged with hydrogen. As soon as the electric discharge is suspended for a short period there is a sudden deterioration of the vacuum. This rapid deterioration is caused above all by the hot metal components and particularly by the anodes because the hydrogen is given off from metals in the vacuum more readily and rapidly, the higher the temperature of the metals. With longer duration of operation at full load the charging with hydrogen can increase to such an extent that finally even during a blocking period of an anode, i. e., the period of operation during which no current is passed, a material quantity of hydrogen emerges from the anode and causes striking back due to rapid deterioration of the vacuum in the vicinity of the anode.

It is well known that the avoidance of the occurrence of such disturbances is one of the main problems in the construction of vacuum discharge apparatus, such as rectifiers for example.

In my application, Serial No. 621,603 of the 9th of July 1932, protection is claimed for the use as cooling medium a liquid which at the most contains and gives off very few free hydrogen ions. In this way I avoid the diffusion of free hydrogen ions through the walls of the vessel with consequent accumulations of hydrogen within the interior of the vacuum vessel endangering the operation. However for various reasons, the cooling liquids referred to in my earlier application as cooling media do not comply with practical requirements in all respects, as has been found by experiment.

It is therefore as stated above, one of the objects of my present invention to provide cooling liquids which satisfy all practical requirements and in accordance with my invention I utilize halogen hydrocarbons which may be of aromatic or aliphatic nature. Primarily I utilize all chlorinated hydrocarbons such as trichlorethylene, chlorethane, carbon tetrachloride, alphachloronaphthalene and so on.

In comparison with other cooling media which also are free from hydrogen ions the use of halogen hydrocarbons has the advantage that the halogen compounds are not liable to catch fire. Consequently it is not necessary to make the cooling chambers of the vacuum vessel in which they are used with thicker walls than is necessary in view of the pressures existing in the vessels during operation. When using cooling media which are liable to catch fire, the cooling chambers must be made with thicker walls in accordance with statutory requirements so that the installation is rendered more expensive.

The cooling chambers in which the cooling media according to my invention are to be employed, can be constructed in any desired manner, e. g., boiling coolers can be used. In general a boiling temperature of 40°–80° will be utilized in order that no excessive pressures arise at the normal working temperatures of 40°–60° which arise in the boiling cooler.

In the accompanying drawing, a mercury vapor rectifier embodying my invention is illustrated in axial vertical section by way of example.

Referring now to the drawing, 1 is the vacuum vessel of the rectifier. The vacuum vessel is made of any suitable metal, for instance, iron. 2 are a pair of anodes which are surrounded by anode sleeves 3, and are introduced through the anode insulators 4, and 5 is the cathode. The vacuum vessel 1 is surrounded by a cooling vessel or jacket 6 in which a liquid cooling medium, in the present instance, carbon tetrachloride, is circulated. The vapor from the heated cooling medium is conducted to a condenser 8 through a pipe 7 at the top of cooling vessel 6, and the condensate is returned to the bottom of the cooling vessel through a pipe 9. By these means, the liquid cooling medium is circulated in the cooling vessel 2, the condenser 8, and the pipes 7 and 9. Any other suitable means than those illustrated may obviously be used for re-cooling the cooling medium and for circulating it in the cooling vessel 6. The boiling liquid employed has to be selected accordingly.

A further requirement which has to be satisfied by the cooling liquid employed is that it should not attack the metal walls of the cooling chamber in any way. In this connection, it should be borne in mind that it is not transport or storage vessels for the liquids in question which are involved, but vessels which are intended for use extending over years and which are comparatively very expensive in consequence of their electric and other equipment. Consequently even the slightest corrosion by the cooling liquid must be avoided as after protracted use such corrosion would lead to disturbances.

The halogen hydrocarbons which are employed in accordance with my invention contain however impurities which in the course of time may attack the metal walls due to the separation of chlorine or hydrochloric acid.

It is another object of my invention to provide a cooling medium which will not attack the metal walls defining the cooling vessel 6. To this end, I treat the halogen hydrocarbons prior to use with alkaline materials which render harmless these impurities of the cooling liquids. Such alkaline materials may for example be soda lye, soda, potash, calciumhydroxide and other alkaline materials which are employed in solid condition or dissolved in water, alcohol, mixtures thereof or other solvents, for example in the form of alcoholic potash lye.

*Example*

1000 cc. carbon tetrachloride are boiled with 1000 cc. alcoholic potash lye for a considerable time in a vessel equipped with a reflux cooler. The mixture is allowed to cool and the liquids separate into two layers in accordance with their specific gravity. The carbon tetrachloride is then drawn off alone and is washed with water until the alkali is entirely removed and a neutral reaction of the carbon tetrachloride is obtained. Residual traces of moisture can be removed by means of any suitable drying agent such as phosphorous pentoxide or the like. If desired the treatment of the halogen hydrocarbons for removing undesired components can be effected under pressure.

I claim:

1. A process for preparing carbon tetrachloride prior to introduction as cooling liquid in a cooling chamber of electric vacuum-discharge apparatus of the kind set forth, comprising the steps of boiling the carbon tetrachloride together with alcoholic potash lye in a vessel furnished with a reflux cooler, allowing the heated liquids to stand, drawing off the carbon tetrachloride, washing said drawn-off carbon tetrachloride with water until a neutral reaction is obtained, and removing residual water by means of a drying agent.

2. An electric discharge apparatus comprising a metal vacuum vessel, anode and cathode means in said vacuum vessel, a cooling vessel for said vacuum vessel, and a liquid chlorinated hydrocarbon in said cooling vessel as the cooling medium.

3. An electric discharge apparatus comprising a metal vacuum vessel, anode and cathode means in said vacuum vessel, a cooling vessel for said vacuum vessel, a liquid chlorinated hydrocarbon in said cooling vessel as the cooling medium, and means for circulating said cooling medium in said cooling vessel.

4. The improvement-step in the method of operating electric discharge apparatus of the type including a metal vacuum vessel, and a cooling vessel for said vacuum vessel, for obviating the necessity of restoring the vacuum in said vacuum vessel by pumping means, comprising circulating a liquid chlorinated hydrocarbon in said cooling vessel.

5. The improvement-step in the method of operating electric discharge apparatus of the type including a metal vacuum vessel, and a cooling vessel for said vacuum vessel, for obviating the necessity of restoring the vacuum in said vacuum vessel by pumping means, comprising circulating carbon tetrachloride in said cooling vessel.

6. The improvement-step in the method of operating electric discharge apparatus of the type including a metal vacuum vessel, and a cooling vessel for vacuum vessel, for obviating the necessity of restoring the vacuum in said vacuum vessel by pumping means, comprising circulating trichlorethylene in said cooling vessel.

7. The improvement-step in the method of operating electric discharge apparatus of the type including a metal vacuum vessel, and a cooling vessel for said vacuum vessel, for obviating the necessity of restoring the vacuum in said vacuum vessel by pumping means, comprising circulating alphachloronaphthalene in said cooling vessel.

8. The improvement-step in the method of operating electric discharge apparatus of the type including a metal vacuum vessel, and a cooling vessel for said vacuum vessel, for obviating the necessity for restoring the vacuum in said vacuum vessel by pumping means, comprising treating a liquid chlorinated hydrocarbon with alkaline material, and circulating the treated liquid in said cooling vessel.

9. The improvement-step in the method of operating electric discharge apparatus of the type including a metal vacuum vessel, and a cooling vessel for said vacuum vessel, for obviating the necessity of restoring the vacuum in said vacuum vessel by pumping means, comprising treating a liquid chlorinated hydrocarbon with alkaline material, removing excess alkali by washing with water, removing residual water by a drying agent, and circulating the treated liquid in said cooling vessel.

10. The improvement-step in the method of operating electric discharge apparatus of the type including a metal vacuum vessel, and a cooling vessel for said vacuum vessel, for obviating the necessity of restoring the vacuum in said vacuum vessel by pumping means, comprising treating a liquid chlorinated hydrocarbon with alkaline material in solution, and circulating the treated liquid in said cooling vessel.

11. The improvement-step in the method of operating electric discharge apparatus of the type including a metal vacuum vessel, and a cooling vessel for said vacuum vessel, for obviating the necessity of restoring the vacuum in said vacuum vessel by pumping means, comprising treating a liquid chlorinated hydrocarbon with alkaline material in solution, removing excess alkali by washing with water, removing residual water by a drying agent, and circulating the treated liquid in said cooling vessel.

12. The improvement-step in the method of operating electric discharge apparatus of the type including a metal vacuum vessel, and a cooling vessel for said vacuum vessel, for obviating the necessity of restoring the vacuum in said vacuum vessel by pumping means, comprising treating a liquid chlorinated hydrocarbon with alkaline material in aqueous solution, and circulating the treated liquid in said cooling vessel.

13. The improvement-step in the method of operating electric discharge apparatus of the type including a metal vacuum vessel, and a cooling vessel for said vacuum vessel, for obviating the necessity of restoring the vacuum in said vacuum vessel by pumping means, comprising treating a liquid chlorinated hydrocarbon with alkaline material in aqueous solution, removing excess alkali by washing with water, removing residual water by a drying agent, and circulating the treated liquid in said cooling vessel.

14. The improvement-step in the method of operating electric discharge apparatus of the type including a metal vacuum vessel, and a cooling vessel for said vacuum vessel, for obviating the necessity of restoring the vacuum in said vacuum vessel by pumping means, comprising treating a liquid chlorinated hydrocarbon with alkaline material in alcoholic solution, and circulating the treated liquid in said cooling vessel.

15. The improvement-step in the method of operating electric discharge apparatus of the type including a metal vacuum vessel, and a cooling vessel for said vacuum vessel, for obviating the necessity of restoring the vacuum in said vacuum vessel by pumping means, comprising treating a liquid chlorinated hydrocarbon with alkaline material in alcoholic solution, removing excess alkali by washing with water, removing residual water by a drying agent, and circulating the treated liquid in said cooling vessel.

WALTER DÄLLENBACH.